Patented Jan. 19, 1932

1,841,622

UNITED STATES PATENT OFFICE

MORDECAI MENDOZA, OF BLACKLEY, MANCHESTER, ENGLAND, ASSIGNOR TO BRITISH DYESTUFFS CORPORATION LIMITED, OF MANCHESTER, ENGLAND

INTERMEDIATES AND DYES THEREFROM

No Drawing. Application filed July 17, 1928, Serial No. 293,496, and in Great Britain July 27, 1928.

In certain copending applications, Serial Nos. 53,404, now Patent No. 1,766,946; 115,-122, now Patent No. 1,766,947; 97,758, filed March 26, 1926; 138,567, now Patent No. 1,766,948 and 180,618, filed April 2, 1927, azo and other dyes have been described, derived from intermediates of the general type:

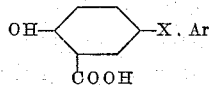

in which X represents a sulphone ($-SO_2-$) or sulphide ($-S-$) bridge, an Ar is an aryl radical carrying one or more amino groups; the salicylic nucleus may also carry substituents in the free positions. The characteristic of these compounds is that they contain a chelate grouping (in this case the grouping

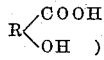

in a part of the molecule separated by a sulphone or sulphide "bridge" from that part of the molecule containing the reactive amino or chromophoric group. One result of this arrangement is that by utilizing the nucleus Ar as the site of a chromophoric grouping, dyes can be made which have the valuable property of remaining substantially unchanged in shade when chromed.

In my copending application, Serial No. 280,649, filed May 25, 1928 (now Patent No. 1,766,949), I have shown that similar advantages result from the use of intermediates of the type:

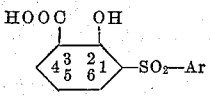

in which positions 5, or 5 and 6, or 5 and 4, are occupied by substituent groups.

The present invention relates to further developments along these lines, and consists in a process for the preparation, and in the use in the manufacture of azo dyes, of intermediates of the type:

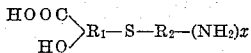

wherein $R_1$ and $R_2$ represent benzene or naphthalene residues and $x$ is 1 or 2 and in which the COOH group and the —S— are attached to $R_1$ in the position ortho to the OH group.

The sulphides having the above structural arangement are also useful in forming azo dyes which are adapted for mordant dyeing and which produce shades which are substantially unchanged when chromed. Such azo dyes have the mordant fixing group or chelate group, in one portion of the molecule which is separated from and united to the chromophoric portion of the molecule by means of a sulphide bridge. In forming such azo dyes from the present intermediates, the benzene or naphthalene group containing the amino group or groups is treated to convert it into a chromophoric group.

These intermediates are prepared from mercapto compounds containing the groups —SH, —OH, and —COOH in positions 1, 2 and 3, respectively, and substituents in positions 5, 5 and 6, or 5 and 4. The mercapto compounds are obtainable, for example, by reduction of the corresponding sulphonyl chlorides as described in Example 1 below, or by a similar process from the sulphinic acids. Other methods of preparation may be employed. The mercapto compounds are in general pale-colored, crystalline substances sparingly soluble in cold water but much more readily soluble in boiling water and easily soluble in ether, alcohol, and alkalies.

Examples of suitable mercapto compounds are:

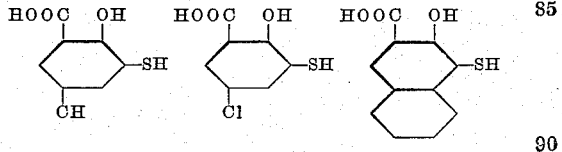

obtainable respectively from p-cresotinic acid, 5-chlorosalicylic acid, and 2:3-hydroxynaphthoic acid, by conversion into the sulphonyl chlorides (e. g., with chloro-sulphonic acid) and subsequent reduction.

The mercapto compounds can be converted into the new series of intermediates by condensation with a halogenated aromatic nitro compound containing reactive halogen, suitable compounds being 1-chloro-2-nitrobenzene, 1-chloro-4-nitrobenzene, 1-chloro-2-nitrobenzene-4-sulphonic acid, 1-chloro-4-nitrobenzene-2-sulphonic acid, 1-chloro-2:4-dinitrobenzene, 1-chloro-2:4-dinitronaphthalene, 4-chloro-3-nitrobenzaldehyde, 4-chloro-3-nitrobenzoic acid, 2-chloro-5-nitrobenzoic acid, 4-chloro-3-nitrobenzonitrile, 2-chloro-5-nitrobenzonitrile, 4-chloro-benzonitrile, 2-chloro-benzonitrile. Corresponding compounds containing other halogens in place of chlorine can be used. My invention is not limited to the specific halogenated nitro-compounds recited, these being merely illustrative.

The nitro- or dinitro-sulphides so obtained can be reduced to amino- or diamino-sulphides in the usual manner, and these products used for the production of azo dyes. The monoamines or the monoacylated diamines may be diazotized and coupled with the usual coupling components. The diamines may be coupled in acid solution with diazo compounds, or may be treated with nitrous acid to give dyes of the Bismarck brown type. Mono- and poly-azo dyestuffs may be produced. These azo dyestuffs are of many different types but they all have the distinguishing characteristic that the chelate group is separated from the chromophore group by a sulphide bridge. They may be represented by the generic formula:

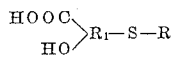

wherein $R_1$ represents a benzene or naphthalene residue which may be further substituted and R represents a benzene or naphthalene residue having an azo group attached thereto, the grouping represented by R possessing chromophoric properties and the COOH and the —S— being attached to $R_1$ in the positions ortho to the OH group.

Both the intermediates and dyes of my invention may be represented by the generic formula:

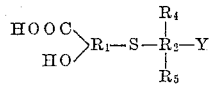

wherein $R_1$ and $R_2$ represent benzene or naphthalene residues in which the COOH group and the —S— are attached to $R_1$ in the ortho positions to the OH group, $R_4$ and $R_5$ represent hydrogen or substituent groups and Y represents hydrogen, $NH_2$, $-N=N-R_6$ or
$$-N=N-R_9-N=N-R_6$$

wherein $R_6$ respresent a coupled residue of an azo dye component and $R_9$ represents a divalent residue of an azo dye component. By "coupled residue of an azo dye component", I mean the coupled residue from an azo dye coupling component or from a diazotized coupling component.

I find that the monoazo dyes derived from my new intermediate are especially advantageous. These monoazo dyes may be represented by the following general formula:

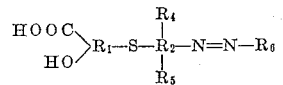

wherein $R_1$ and $R_2$ represent benzene or naphthalene residues, $R_4$ represents a substituent such as an amino group, acylated amino group, an aldehyde group, a carboxyl group, a nitrile group, sulphonic group or hydrogen, $R_5$ represents hydrogen or an amino group and $R_6$ represents a coupled residue of an azo dye component and in which the COOH and OH are attached as described above.

However, the production of polyazo dyes is also within the scope of the present invention. In the examples hereinafter given I set forth typical methods of forming certain general classes of diazo dyes as well as monoazo dyes of the above general type.

I describe in the examples the production of several typical intermediates and azo dyes therefrom, these examples being illustrative and not limiting. The parts are by weight.

*Example 1:*—25 parts of 3-chlorosulphonyl-5-methylsalicylic acid in intimate mixture with 40 parts of zinc dust are slowly stirred at the ordinary temperature into 280 parts of 15 per cent hydrochloric acid. Stirring is continued for some hours in the course of which 5.5′-dimethyl-3-3′-dithio-disalicylic acid is formed and separated, in good yield, as a nearly white compound.

The precipitate is filtered off and freed from zinc by treatment at the boil with sufficient sodium carbonate solution to ensure a definite alkaline reaction to test paper. The precipitated zinc carbonate is filtered off while the mixture is still hot and the alkaline filtrate is acidified with strong hydrochloric acid. The dithio compound is precipitated in pure condition.

When dry it is a pale cream colored powder, insoluble in water but soluble in ether and alcohol. It is also readily soluble in alkaline solutions, the solution in soda being pale yellow in color while that in caustic is orange. It melts at 249°–250° C. (uncorrected).

The dithio compound similarly obtained from 5-chloro-salicylic acid is also cream colored and behaves similarly towards solvents. The alkaline solutions are greenish in color. It melts at 250°–252° C. with darkening. The dithio compound from beta-hydroxy naphthoic acid, also obtained in a similar manner is lemon yellow in color. It melts, with decomposition, at about 280° C. It is readily soluble in alcohol but less so in ether, is insoluble in water and easily soluble in alkalies. The solution in soda is yellow in color, while in caustic it is much greener and exhibits fluorescence. All these dithio compounds may be prepared by reduction—in exactly similar manner—of the corresponding o-sulphinic acids.

These dithio compounds on further reduction yield the corresponding mercaptans. I find that reduction in alkaline solution by means of hydrosulphite is very effective for this purpose.

Thus 8 parts of hydrosulphite are added to a solution of 10 parts of 5.5'-dimethyl-3.3'-dithiodisalicylic acid in 100 parts of caustic soda solution (8 per cent). After standing some hours the solution becomes much paler in color. It is then acidified with 60 parts of 36 per cent hydrochloric acid and filtered after stirring for a short time.

The crude mercaptan so obtained is purified by repeatedly extracting with boiling water. On cooling the aqueous extracts, the mercaptan is deposited as a fine, nearly white crystalline powder melting at 198° C. (uncorr.).

5-chloro-3-mercapto-salicylic acid melts at 198°–200° C. with slight darkening and 1-mercapto-2-hydroxy-naphthalene-3-carboxylic acid chars above 160° C.

*Example 2:*—18.4 parts of 3-mercapto-5-methyl-salicylic acid are dissolved in 150 parts of water with sufficient soda ash to produce a solution neutral to test paper, and 25.95 parts of the sodium salt of 4-chloro-3-nitro-benzene sulphonic acid are added.

The mixture is gently boiled under a reflux condenser for some hours by which time condensation, resulting in the formation of the nitro-diaryl-sulphide, is complete. During the course of the condensation, the liquid assumes a somewhat greener tinge.

On cooling, the condensation product is deposited as a yellow crystalline mass but for the present purpose its isolation is not necessary.

Reduction to the amino compound can be carried out by means of any of the usual methods. I find iron, in presence of a little mineral acid and stannous chloride in presence of strong hydrochloric acid, to be very efficacious for the purpose. The amino compound in approximately 90 per cent of the yield theoretically possible is obtained by strongly acidifying the deeply colored alkaline solution obtained after eliminating the metal used in the reduction by means of alkali at the boil.

It is a white crystalline powder moderately soluble in water and easily soluble in alkali. On treatment with nitrous acid it yields a fairly sparingly soluble bright yellow crystalline diazo compound which readily couples with the usual coupling components to form new azo dyestuffs.

3-mercapto-5-chloro-salicylic and 1-mercapto-2-hydroxy-naphthalene-3-carboxylic acids condense in exactly similar manner with 4-chloro-3-nitro-benzene sulphonic acid to yield nitro-diaryl sulphides which reduce to the corresponding amino derivatives. These exhibit properties similar to the above.

Isomeric amino compounds are obtained, if, in place of 4-chloro-3-nitro-benzene sulphonic acid, 2-chloro-5-nitro-benzene sulphonic acid is used.

*Example 3:*—35.5 parts of 2-amino-4-sulpho-2'-hydroxy-3'-carboxy-5'-methyl-diphenyl sulphide are dissolved in about 250 parts of water with sufficient soda ash to produce a solution neutral to test paper.

6.9 parts of sodium nitrite are then added and the mixture is stirred at 5–10° C. into 11 parts of hydrochloric acid in 150 parts of water. A suspension of the diazo compound is thus obtained. When diazotization is complete it is run into a solution of 14.4 parts of beta-naphthol in about 200 parts of water and 4 parts of caustic soda together with sufficient soda ash to ensure an alkaline coupling. Formation of a red dyestuff at once takes place and, when the coupling is finished, this is salted out in the usual manner. The dry dyestuff is a bright red powder easily soluble in water giving a reddish-orange solution. It is soluble in strong sulphuric acid with formation of a reddish-violet solution from which the dyestuff is reprecipitated on dilution with water. It is insoluble in strong hydrochloric acid while in strong aqueous caustic soda it forms a red solution.

Printed on cotton with chrome mordant scarlet shades are obtained of very good fastness to soap and chlorine. A similar shade is produced on wool from an acid bath. This is altered to a very slight degree on after-chroming. Such treatment increases the fastness.

Dyestuffs of very similar shades and qualities are produced when 2-amino-4-sulpho-2'-hydroxy-3'-carboxy-5'-chloro-diphenyl sulphide and 2-amino-4-sulphophenyl-2-hydroxy-3-carboxynaphthyl sulphide, used as diazo components, are coupled with the same end components. This applies also to the isomeric amino compounds mentioned in Example 2.

*Example 4:*—35.5 parts of 2-amino-4-sulpho-2'-hydroxy-3'-carboxy-5'-methyl-diphenyl sulphide are dissolved in about 250 parts of water with sufficient soda ash to produce a solution neutral to test paper.

6.9 parts of sodium nitrite are then added and the mixture is stirred at 5–10° C. into 11 parts of hydrochloric acid in 150 parts of water. A suspension of the diazo compound is thus obtained. On completion of the diazotization a solution of 23.9 parts of 2:8-aminonaphthol-6-sulphonic acid in 250 parts of water with sufficient soda to give a neutral solution is slowly added. By this means coupling is effected in acid medium and results in the formation of a brilliant bluish-red dyestuff which is salted out in the usual manner when complete combination has been effected. When dry, the dyestuff is a dark blue red powder which dissolves in water with formation of a red solution. The addition of mineral acids causes precipitation of the color. It dissolves in concentrated sulphuric acid to a reddish-violet solution and also in strong aqueous caustic soda to a blue-red solution. Printed on cotton with chrome mordant, bright blue-red shades are obtained of good fastness properties. Similar shades are produced on wool from an acid bath. These shades are practically unaffected by after-chroming.

*Example 5:*—35.5 parts of 2-amino-4-sulpho-2'-hydroxy-3'-carboxy-5'-methyl-diphenyl sulphide are dissolved in about 250 parts of water with sufficient soda ash to produce a solution neutral to test paper.

6.9 parts of sodium nitrite are then added and the mixture is stirred at 5–10° C. into 11 parts of hydrochloric acid in 150 parts of water. A suspension of the diazo compound is thus obtained. When diazotization is complete it is run into a solution of 32.3 parts of 1-(2:5-dichloro-4-sulphophenyl) 3-methyl-5-pyrazolone in 200 parts of water containing 25 parts of anhydrous sodium carbonate. Coupling,—which is then effected in alkaline medium,—results in the formation of a yellow dyestuff which is isolated by salting out after giving the solution a slight mineral acidity.

When dry the new dyestuff is a dark yellow powder fairly soluble in water with formation of a greenish-yellow solution. It dissolves in strong mineral acids to a yellowish-orange solution from which the dyestuff is precipitated on dilution with water.

In strong aqueous caustic caustic soda it dissolves with formation of a golden yellow solution.

Printed on cotton with chrome mordant, bright yellow shades are obtained of very good fastness to soaping.

When dyed on wool from an acid bath yellow shades are produced which become somewhat greener on after-chroming.

*Example 6:*—18.4 parts of 3-mercapto-5-methyl salicylic acid are dissolved in 150 parts of water with sufficient soda ash to produce a solution neutral to test paper and 20.25 parts of 2:4-dinitrochlorobenzene are added. On boiling the mixture, condensation takes place with extraordinary rapidity and the sodium salt of the dinitro sulphide begins to separate as a yellow crystalline mass in the course of a few minutes.

This condensation can also be carried out if alcohol is used as solvent in place of water. In this case the free mercaptan and the equivalent amount of 2:4-dinitrochlorobenzene are gently boiled with the alcohol in the presence of a mild acid binding agent as, for example, sodium acetate. The free dinitro body is obtained as a pale yellow colored powder by precipitation by means of mineral acid from the alkaline solution. It melts at 27° C. with decomposition.

Reduction, by means of stannous chloride in presence of strong hydrochloric acid, gives the diamino compound. This is precipitated from its solution in acids or alkalies by bringing to the neutral point. It is, when pure, nearly white in color and soluble in ether and alcohol. It melts at 178–180° C. with darkening.

As a dyestuff component this diamino compound is capable of use in two ways. In the first place being a meta diamine it can be made to couple with diazo compounds very readily, while, secondly, it can undergo mono acylation and the mono acyl derivative can be used as a diazo component for the production of yet a further new range of dyestuffs.

Similar meta-diamino-diaryl-sulphides are obtained when the other mercapto compounds already mentioned are used in place of 3-mercapto-5-methyl-salicylic acid.

If condensation is carried out between the mercapto derivatives and 4-chloro-3:5-dinitrobenzenesulphonic acid, reduction gives a sulphonated meta-diamino-diaryl sulphide which is capable of tetrazotization in the normal manner.

The diazo dyes obtained by tetrazotizing and coupling such sulphonated meta-diamino-diaryl sulphides may be represented by the formula:

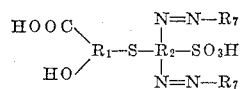

wherein $R_7$ represents the residue of an azo dye coupling component.

*Example 7:*—The diazzo compound obtained in the customary manner from 22.3 parts of naphthionic acid is added at 5–10° C. to a solution of 29 parts of 2:4-diamino-2'-hydroxy-3'-carboxy-5'-methyldiphenyl sulphide in 300 parts of water with sufficient soda ash to ensure alkaline coupling.

The reddish-brown dyestuff formed is isolated by salting out. When printed on cotton with chrome mordant, red-brown shades are obtained of good soap fastness, a similar shade being produced on wool from an acid bath.

This dyestuff has the probable formula

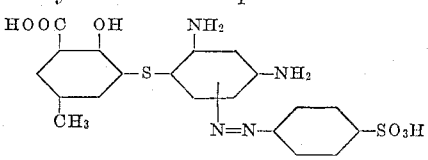

If in place of naphthionic acid, the equivalent amount of benzidine (9.2 parts) is used, coupling with the tetrazo compound produces a dyestuff which yields brown shades on cotton and wool while a very deep brown dyestuff is obtained when the aminoazo compound, benzeneazo-1-naphthylamine-6(7)-sulphonic acid is used as the diazo component.

*Example 8:*—29 parts of 2:4-diamino-2'-hydroxy-3'-carboxy-5'-methyldiphenyl sulphide are dissolved in 300 parts of water with sufficient soda ash to obtain a neutral solution.

Monoacetylation is effected by stirring for some hours with 11 parts of acetic anhydride after addition of 14 parts of sodium acetate. The mixture is then made very faintly alkaline by addition of soda ash and 6.9 parts of sodium nitrite are added. The whole is then slowly stirred into 11 parts of hydrochloric acid, contained in 150 parts of water, at 5-10° C.

When diazotization is complete a neutral solution of 2:8-amino naphthol-6-sulphonic acid is slowly stirred in. The red dyestuff formed is readily isolated by salting out. It produces red shades on cotton and wool of good soap and chlorine fastness.

If R salt in presence of alkali is used as the coupling component a reddish-orange dye is formed while the use of 1-(2:5-dichloro-4-sulphophenyl)-3-methyl-5-pyrazolone as second component results in the formation of a yellow dyestuff.

*Example 9:*—35.5 parts of 2-amino-4-sulpho-2'-hydroxy-3'-carboxy-5'-methyl-diphenyl sulphide are diazotized in the same manner as in Example 8, with the aid of 6.9 parts of sodium nitrite.

Into the stirred diazo suspension so obtained is slowly run a cooled solution of 13.7 parts of 4-methoxy-m-toluidine in 150 parts of water containing 10 parts of hydrochloric acid.

Coupling is effected by the addition of sodium acetate to reduce the mineral acidity of the reacting mixture and when complete, the intermediate mono dyestuff is isolated by once again making slightly acid with mineral acid and filtering. It is pasted up with 400 parts of water and stirred with 35 parts of hydrochloric acid (31.5 per cent). Rediazotization is effected by slowly adding to the stirred paste 6.9 parts of sodium nitrite in 50 parts of water. When rediazotization is complete the product is slowly stirred at about 10° C. into a solution of 33.7 parts of monosodium salt of 2-phenylamino-5-naphthol-7-sulphonic acid in 300 parts of water together with sufficient soda ash to ensure a definite alkaline reaction at the end. At the completion of the coupling the new dyestuff is isolated by salting in the usual manner.

When the dyestuff is dried and ground it is a very dark powder. Wool is dyed by it from an acid bath in red violet shades of good fastness to soaping. After-chroming produces very little change, the shade becoming somewhat deepened. When printed on cotton with chrome mordant red-violet shades of good soap and chlorine fastness are obtained.

Dyestuffs of very similar shades and fastness properties are obtained in the same manner from 2-amino-4-sulpho-2'-hydroxy-3'-carboxy-5'-chloro-diphenyl sulphide and 2-amino-4-sulphophenyl-2'-hydroxy-3'-carboxy naphthyl sulphide when these are used as the diazo components.

What I claim and desire to secure by Letters Patent is:—

1. In the manufacture of azo dye intermediates and related azo dyestuffs carrying a chelate group and adapted for mordant dyeing, the process which comprises diazotizing an aromatic amino sulphide having the probable formula

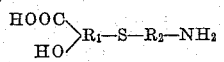

wherein $R_1$ and $R_2$ represent benzene or naphthalene residues in which the COOH group and the —S— are attached to $R_1$ in the ortho positions to the OH group, and then coupling the diazotized amino sulphide with an azo dye coupling component.

2. In the manufacture of azo dye intermediates and related azo dyestuffs carrying a chelate group and adapted for mordant dyeing, the process which comprises diazotizing an aromatic amino sulphide having the probable formula

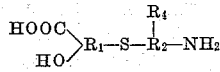

wherein $R_1$ and $R_2$ represent benzene or naphthalene residues, $R_4$ represents hydrogen, an aldehyde group, a carboxyl group, a nitrile group, sulphonic group or an acylated amino group, and in which the COOH group and the —S— are attached to $R_1$ in the ortho positions to the OH group, and then coupling the diazotized amino sulphide with an azo dye coupling component.

3. In the manufacture of new azo dye intermediates and new azo dyestuffs therefrom, the step which comprises condensing a benzene or naphthalene 1-mercapto-2-hydroxy-3-carboxylic acid with a benzene or naphthalene nitro compound having a labile halogen atom.

4. In the manufacture of new azo dye intermediates and new azo dyestuffs therefrom, the steps which comprise condensing a benzene or naphthalene 1-mercapto-2-hydroxy-3-carboxylic acid with a benzene or naphthalene nitro compound having a labile halogen atom and reducing the nitro groups of the resulting compound to amino groups.

5. In the manufacture of new azo dye intermediates and azo dyes therefrom, the steps which comprise diazotizing the product obtained from the process of claim 4 and then coupling the resulting diazotized amino sulphide with an azo dye coupling component.

6. As new azo dye intermediates and related azo dyestuffs, the compositions of matter represented by the formula

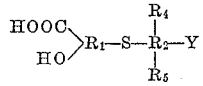

wherein $R_1$ and $R_2$ represent benzene or naphthalene residues in which the COOH group and the —S— are attached to $R_1$ in the ortho positions to the OH group, $R_4$ represents an amino group, an aldehyde group, a carboxyl group, a nitrile group, an acylated amino group, a sulphonic group or hydrogen, $R_5$ represents hydrogen or an amino group, and Y represents a substituent selected from a group consisting of hydrogen, $NH_2$, $-N=N-R_6$ or $-N=N-R_9-N=N-R_6$, wherein $R_6$ represents a coupled residue of an azo dye component and $R_9$ represents a divalent residue of an azo dye component.

7. Mixed diaryl sulphides having the probable formula

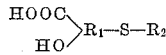

wherein $R_1$ and $R_2$ represents benzene or naphthalene residues and in which the COOH group and the —S— are attached to $R_1$ in the ortho positions to the OH group.

8. As new dyestuff intermediates, mixed diaryl sulphides having the probable formula

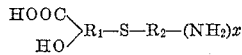

wherein $R_1$ and $R_2$ represent benzene or naphthalene residues and $x$ is 1 or 2 and in which the COOH and the —S— are attached to $R_1$ in the ortho positions to the OH group.

9. As new dyestuff intermediates, mixed diaryl sulphides having the probable formula

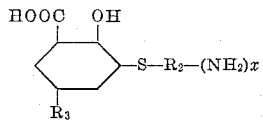

wherein $R_2$ represents a benzene or naphthalene residue, $R_3$ represents $CH_3$ or Cl and $x$ is 1 or 2.

10. As new dyestuff intermediates, mixed diaryl amino sulphides having the probable formula

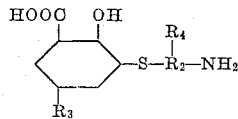

wherein $R_2$ represents a benzene or naphthalene residue, $R_3$ represents $CH_3$ or Cl, and $R_4$ represents an amino group, an aldehyde group, a carboxyl group, a nitrile group, an acylated amino group, a sulphonic group or hydrogen.

11. As a new dyestuff intermediate, a mixed diphenyl amino sulphide having the probable formula

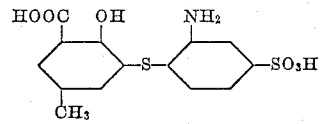

12. Azo dyes carrying a chelate group and adapted for mordant dyeing with the chelate group separated from the chromophore group by a sulphide bridge, said azo dyes being mixed sulphides with the probable formula

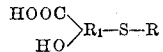

wherein $R_1$ represents a benzene or naphthalene residue and R represents a benzene or naphthalene residue having an azo group attached thereto, the grouping represented by R possessing chromophoric properties, and in which the COOH group and the —S— are attached to $R_1$ in the ortho positions to the OH group, the said dyestuffs producing shades which are substantially unchanged when chromed.

13. Azo dyestuffs carrying a chelate group and adapted for mordant dyeing, with the chelate group separated from the chromophore group by a sulphide bridge, the said azo dyes being mixed sulphides having the probable formula

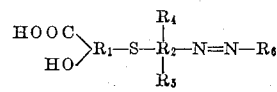

wherein $R_1$ and $R_2$ represent benzene or naphthalene residues, $R_4$ represents an amino group, an acylated amino group, an aldehyde group, a carboxyl group, a nitrile group, a sulphonic group or hydrogen, $R_5$ represents hydrogen or an amino group and $R_6$ represents the coupled residue of an azo dye component and in which the COOH group and the —S— are attached to $R_1$, in the ortho positions to the OH group, the said dyestuffs producing shades which are substantially unchanged when chromed.

14. Azo dyestuffs carrying a chelate group adapted for mordant dyeing with the chelate group separated from the chromophore group by a sulphide bridge, the said azo dyes being mixed sulphides having the probable formula

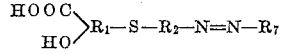

wherein $R_1$ and $R_2$ represent benzene or naphthalene residues, $R_7$ represents a coupled residue from an azo dye coupling component and in which the COOH and the —S— are attached to $R_1$ in the ortho positions to the OH group.

15. Azo dyestuffs carrying a chelate group and adapted for mordant dyeing, with the chelate group separated from the chromophore group by a sulphide bridge, the said azo dyes being mixed sulphides having the probable formula

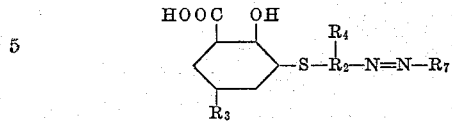

wherein $R_2$ represents a benzene or naphthalene residue, $R_4$ represents hydrogen, a sulphonic group, an aldehyde group, a carboxyl group, a nitrile group, or an acylated amino group, $R_3$ represents $CH_3$ or $Cl$, and $R_7$ represents a coupled residue from an azo dye coupling component.

16. Azo dyestuffs carrying a chelate group and adapted for mordant dyeing, with the chelate group separated from the chromophore group by a sulphide bridge, the said azo dyes being mixed sulphides having the probable formula

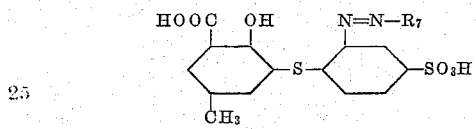

wherein $R_7$ represents a coupled residue from an azo dye coupling component.

17. The product of claim 16 wherein $R_7$ represents the residue from coupled beta-naphthol.

18. Azo dyestuffs carrying a chelate group adapted for mordant dyeing with the chelate group separated from the chromophore group by a sulphide bridge, the said azo dyes being mixed sulphides having the probable formula

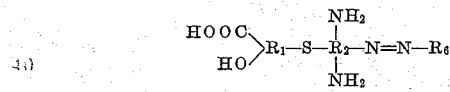

wherein $R_1$ and $R_2$ represent benzene or naphthalene residues, $R_6$ represents a coupled azo dye component derived from a diazotized coupling component and in which the COOH group and the —S— are attached to $R_1$ in the ortho positions to the hydroxy group.

19. An azo dyestuff having the probable formula

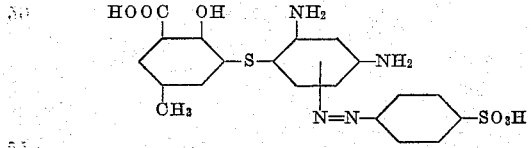

In testimony whereof I affix my signature.
MORDECAI MENDOZA.